T. J. NOPP.
SCRAPER.
APPLICATION FILED JUNE 2, 1919.

1,362,031.

Patented Dec. 14, 1920.

Inventor
Thomas J. Nopp,
By Lancaster and Allwine
his Attorneys

UNITED STATES PATENT OFFICE.

THOMAS J. NOPP, OF CHARLESTON, WASHINGTON.

SCRAPER.

1,362,031.   Specification of Letters Patent.   Patented Dec. 14, 1920.

Application filed June 2, 1919. Serial No. 301,243.

*To all whom it may concern:*

Be it known that I, THOMAS J. NOPP, a citizen of the United States, residing at Charleston, in the county of Kitsap and State of Washington, have invented certain new and useful Improvements in Scrapers, of which the following is a specification.

This invention relates to a scraper particularly designed for use in cleaning or scraping culinary utensils, and an object of the invention is to provide a scraper as specified, which is comparatively simple in construction, and may be manufactured at a relatively low cost as well as one which is particularly designed for use in scraping various types of articles or utensils, comprising a carrying plate having laterally extending flanges about its edges provided with spaced, concaved and convex portions adapted to fit various corners and curvatures of the article to be cleaned.

A further object of the invention is to provide a handle for the scraper which is pivotally connected to the carrying plate and which handle carries a pin adapted for insertion through any one of a plurality of openings in the carrying plate to hold the handle in adjusted position with respect to the carrying plate, which openings also serve as drain openings when the scraper is employed for cleaning a sink or in removing material including liquid from a container or utensil.

Other objects of the invention are to appear in the following detailed description taken in connection with the accompanying drawings, forming a part of this specification, and in which drawings.

Figure 1:
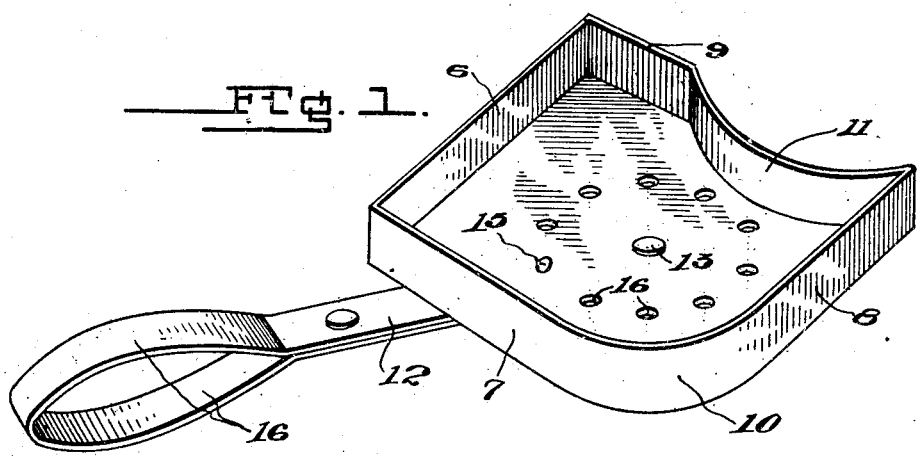
Figure 1 is a perspective view of the improved scraper.
Figure 2:
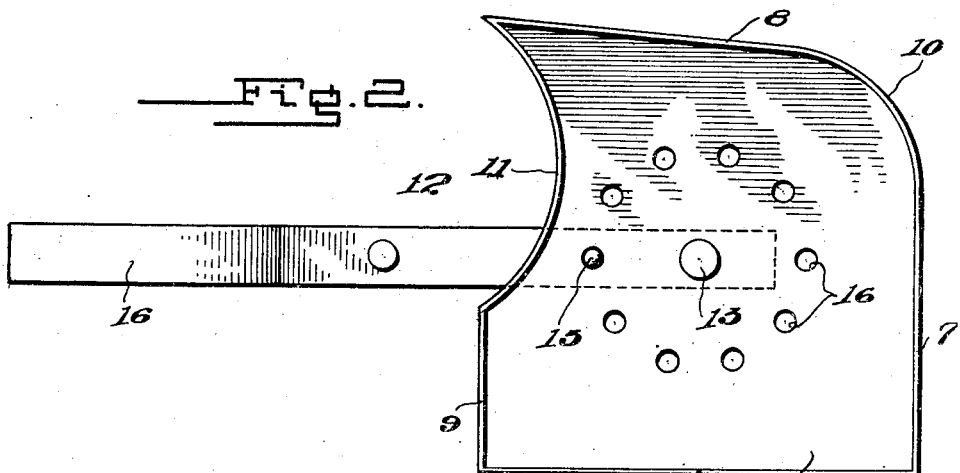
Fig. 2 is a plan view of the scraper.
Figure 3:
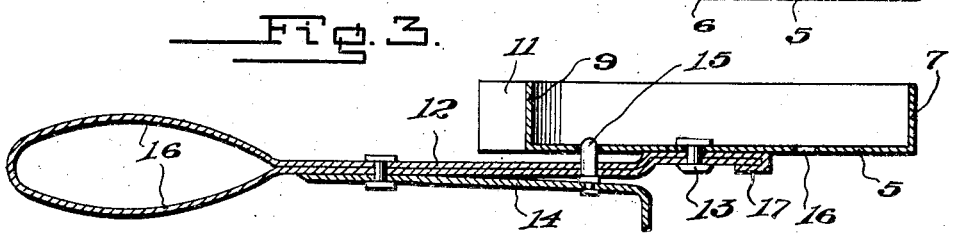
Fig. 3 is a longitudinal section through the scraper.

Referring more particularly to the drawings, 5 indicates the carrying plate of the scraper structure, which has laterally extending flanges 6, 7, 8 and 9 formed along its edges. The flanges 7 and 8 are joined by a convexed portion 10, and provide two straight portions forming an oblique angle with respect to each other providing a scraping surface which will engage the sides and bottom and the rounded corner portions of utensils of such nature for thoroughly scraping them. The flanges 6 and 7 meet, in an abrupt corner or at right angles to each other, forming a square corner which is adapted to fit in the corners of various types of pans the sides of which are positioned at right angles to the bottom thereof, such as breadpans, cake pans or the like. The flange 9 is provided with a concave portion 11 one terminal of which is at one end of the flange and is joined to the straight portion of the flange 8, providing a relatively sharp point which is adapted to engage in crevices or recesses such as formed where the edges of the sides of the pan or utensil are rolled upon themselves or in analogous places, while the concave portion 11 is designed for use in scraping various articles, such as rolling pins or other utensils having convexed surfaces.

The carrying plate 5 has a handle 12 pivotally connected thereto and opposite to the side containing the extending flanges by means of a rivet 13, which handle carries a spring tongue 14. A pin 15 is carried by the spring tongue 14 and extends through an opening in the handle 12 and is adapted to extend through any one of a plurality of openings 16 formed in the carrying plate 5. The openings 16 have their centers in a circle concentric of the axis about which the handle 12 moves, and the insertion of the pin 15 through any of the openings 16 will hold the handle 12 in the desired adjusted position with respect to the carrying plate 5.

The handle 12 is preferably formed of a single strip of sheet metal, bent intermediate its ends to provide a pair of links, the portions of which adjacent the ends of the strip are bowed outwardly to form a hand grip 16, while the ends of the links adjacent the carrying plate 5 are overturned as shown at 17 to engage over the terminal or end of the other link. These links of the metal strip intermediate the bowed portions 16 and the overturned portions 17 lie in abutting engagement with each other and their portions adjacent their ends are bent so that the outer surface of the outermost of the links will engage the outer surface of the carrying plate 5.

While in the foregoing description the scraper has been described as particularly adapted for use in connection with culinary utensils, it is to be understood that the scraper may be used for scraping hogs after they have been scalded during butchering or scraping meat blocks, bread boards or any analogous structure.

When the scraper is used, for removing materials scraped from a utensil or for removing sediment from a sink for which it is adapted owing to the fact that the flanges on the carrying plate form a receptacle for retaining such refuse, the liquid is drained from the refuse, through the openings 16.

Changes in details may be made without departing from the spirit of this invention, but;

I claim:

1. In a scraper, a carrying plate, transversely extending scraping flanges about the edges of said carrying plate, said carrying plate provided with an arcuate portion at one corner forming a convex portion of the flange thereat and which joins with straight flange portions along two edges of the carrying plate, another of said flanges being provided with a concave portion merging into one of said straight flange portions and forming a relatively sharp point, a handle pivotally carried by the carrying plate, a plurality of openings in the carrying plate, concentric of the pivot of said handle, and means carried by said handle for insertion through any one of said openings to hold the handle in adjusted position with respect to the carrying plate.

2. In a scraper, a carrying plate having transversely extending scraping flanges about the edges of said carrying plate and upon one side thereof, a handle pivotally connected upon the opposite side of the carrying plate, said handle having an aperture therein, a spring mounted upon said handle, a pin projecting upwardly from said spring and adapted to be normally forced by said spring into engagement with the aperture in the handle and the apertures in the carrying plate for maintaining the handles in any rigid position with respect to the carrying plates.

THOMAS J. NOPP.